Patented Jan. 3, 1939

2,142,847

UNITED STATES PATENT OFFICE 2,142,847

AMINOARYLSULPHONYLAMINO ALIPHATIC ACIDS AND THEIR SALTS

Martin E. Hultquist, Plainfield, N. J., assignor to The Calco Chemical Company, Inc., Bound Brook, N. J., a corporation of Delaware No Drawing. Application October 30, 1937,
Serial No. 171,895

7 Claims. (Cl. 260—518)

This invention relates to aminoarylsulphonylaminoaliphatic acids and their salts. More particularly, the invention relates to sulphanilylaminoaliphatic acids and their salts.

The present invention is directed to a new class of chemical compounds which are useful as azo dye intermediates and which show varying degrees of therapeutic action against streptococci and similar bacteria. The present invention includes both the acids and their salts. The compounds of the present invention may be represented by the following formula:

$$R-SO_2-NH-R'-COOX$$

in which R is an aminoaryl radical and R' is an aliphatic radical and X is a hydrogen atom or a base.

I have found that compounds in which $R-SO_2$ is a sulphanilyl group are particularly effective therapeutically but the invention is not limited to this preferred class of compounds. On the contrary, compounds in which R is an aminonaphthalene group or a strepto N polysulphanilyl group are also included. Typical examples of the present invention are sulphanilyl and metanilylaminoacetic acids and their salts, the corresponding compounds of glutamic acid, alanine and the like. The corresponding naphthalene compounds may also be produced and are included in the present invention, such as for example, naphthionylaminoacetic acid etc.

While the present invention is not limited to any particular process of producing the new compounds, I have found that in the case of the sulphanilylamino compounds they can be very simply prepared by reacting acetylsulphanilylchloride on an aqueous solution of an alkali metal salt of the aminocarboxylic acid in question in the presence of alkali metal carbonates or hydroxides to maintain an alkaline reaction. Metanilyl compounds are ordinarily prepared by a somewhat different procedure, such as that used in preparing metanilamide.

The invention will be described in greater detail in conjunction with specific examples which are typical illustrations of the invention but do not limit its scope to the details therein set forth. The parts are by weight and, in the case of water, by the corresponding volume.

Example 1

*Sodium sulphanilylaminoacetate*

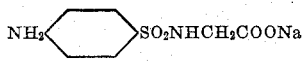

An aqueous solution of sodium aminoacetate is prepared by dissolving aminoacetic acid and soda ash in water in the proportion of 75 parts (1 mol) of aminoacetic acid, 50 parts of soda ash and 350 vols. of water. One mol of freshly prepared acetylsulphanilylchloride paste is then gradually added with agitation, the pH being maintained between 8 and 10 by the addition of 50% caustic soda solution as necessary. Ice is also used to maintain the temperature from 45° to 50° C. After all of the acetylsulphanilylchloride is dissolved, stirring is continued for 40 minutes and the product hydrolyzed by acidifying with hydrochloric acid until the reaction is acid to Congo red and then adding 200 vols. of concentrated acid in excess and boiling for an hour.

The hydrolysis mixture is evaporated to 550 vols., filtered hot and then neutralized to pH of 4 with caustic soda. The neutralized mixture is concentrated by evaporation, cooled and alcohol added to precipitate the solids. The sodium sulphanilylaminoacetate is then extracted with boiling alcohol and purified by recrystallization from 60–70% alcohol, using decolorizing carbon if necessary.

Example 2

*Mono sodium N sulphanilylglutamate*

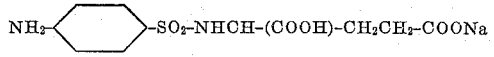

Mono sodium N sulphanilylglutamate is prepared by producing the corresponding acetyl derivative in the same manner as described in Example 1, on substituting glutamic for aminoacetic acid. The reaction mixture is hydrolyzed as described in Example 1 by means of hydrochloric acid and boiling.

The hydrolysis mixture is evaporated to 550 vols. and filtered off hot, followed by neutralizing to a pH of 4 with caustic soda. The neutralized mixture is then cooled and mono sodium N sulphanilylglutamate crystallizes out. The product is preferably recrystallized from an equal amount of water using decolorizing carbon. The crystallization is very slow, requiring approximately 24 hours for completion. In removing the crystals, they are dried in a vacuum desiccator and the mother liquor concentrated and further crystals obtained.

In the examples the products were hydrolyzed in acid solution, but it should be understood that the invention is not limited to hydrolysis in an acid medium and an alkaline hydrolysis with caustic soda or a similar compound to furnish the alkalinity can be employed and is included in the invention.

The examples describe a process in which the amino group of the sulphanilylchloride is acetylated. This is the cheapest acetylated sulphanilylchloride but, of course, the amino group may be united with other acyl radicals since the nature of the acyl radical does not materially affect the reaction.

What I claim is:

1. As new compounds, aminoarylsulphonylaminoaliphatic acid compounds having the following formula: R—SO$_2$—NH—R′—COOX in which R is an aminoaryl radical, R′ is an aliphatic radical and X a member of the group consisting of hydrogen, alkali metals and alkaline earth metals.

2. As new compounds, sulphanilylaminoaliphatic acid compounds having the following formula:

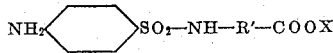

in which R′ is an aliphatic radical and X a member of the group consisting of hydrogen, alkali metals and alkaline earth metals.

3. As new compounds, sulphanilylaminoacetic acid compounds having the following formula:

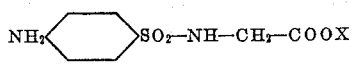

in which X is a member of the group consisting of hydrogen, alkali metals and alkaline earth metals.

4. As new compounds, sulphanilylglumatic acid compounds having the following formula:

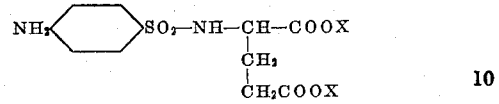

in which X is a member of the group consisting of hydrogen, alkali metals and alkaline earth metals.

5. A method of producing sulphanilylamino aliphatic acid compounds, which comprises reacting para acylaminobenzenesulphonylchloride with the corresponding aminoaliphaticcarboxylic acid and hydrolyzing the product.

6. A method of producing sulphanilylaminoacetic acid, which comprises reacting para acylaminobenzenesulphonylchloride with aminoacetic acid and hydrolyzing the product.

7. A method of producing sulphanilylglumatic acid, which comprises reacting para acylaminobenzenesulphonylchloride with glutamic acid and hydrolyzing the product.

MARTIN E. HULTQUIST.

CERTIFICATE OF CORRECTION.

Patent No. 2,142,847. January 3, 1939.

MARTIN E. HULTQUIST.

It is hereby certified that error appears in the printed specification of the above numbered patent requiring correction as follows: Page 2, first column, line 5, for "acetylated" read acylated; and that the said Letters Patent should be read with this correction therein that the same may conform to the record of the case in the Patent Office.

Signed and sealed this 14th day of February, A.D. 1939.

Henry Van Arsdale.

(Seal) Acting Commissioner of Patents.